(12) United States Patent
Bernot et al.

(10) Patent No.: US 10,250,087 B2
(45) Date of Patent: Apr. 2, 2019

(54) HOMOPOLAR COMPOUND-TYPE ASYNCHRONOUS MOTOR

(71) Applicant: Francecol Technology, Saint Cyr sur Loire (FR)

(72) Inventors: François Bernot, Luynes (FR); Victor Bernaola, Tours (FR); Jonh Edwin Morales Morales, Tours (FR)

(73) Assignee: Francecol Technology, Saint Cyr sur Loire (FR)

( * ) Notice: Subject to any disclaimer, the term of this patent is extended or adjusted under 35 U.S.C. 154(b) by 0 days.

(21) Appl. No.: 15/826,475

(22) Filed: Nov. 29, 2017

(65) Prior Publication Data

US 2018/0083497 A1    Mar. 22, 2018

Related U.S. Application Data

(63) Continuation of application No. PCT/FR2016/051292, filed on May 30, 2016.

(30) Foreign Application Priority Data

May 29, 2015   (FR) ...................................... 15 01109

(51) Int. Cl.
*H02K 19/06* (2006.01)
*H02K 1/14* (2006.01)
*H02K 19/14* (2006.01)

(52) U.S. Cl.
CPC ............. *H02K 1/145* (2013.01); *H02K 1/146* (2013.01); *H02K 19/06* (2013.01); *H02K 19/14* (2013.01); *H02K 2201/12* (2013.01)

(58) Field of Classification Search
CPC ........ H02K 19/14; H02K 1/145; H02K 19/06; H02K 1/146; H02K 2201/12; H02K 1/14
USPC .... 310/179–210, 254, 139, 257, 254.1, 263, 310/266
See application file for complete search history.

(56) References Cited

U.S. PATENT DOCUMENTS

2006/0131986 A1*   6/2006   Hsu ........................ H02K 21/24
310/268

\* cited by examiner

*Primary Examiner* — Naishadh Desai
(74) *Attorney, Agent, or Firm* — Christensen O'Connor Johnson Kindness PLLC; Llewellyn Lawson; Kyle Yarberry

(57) ABSTRACT

Disclosed is an asynchronous rotating electric machine in which none of the electrical windings is rotating, said machine having a homopolar compound structure. The machine comprises: a rotor including magnetic flux return parts; and a stator formed by a pair of armatures and a magnetic wedge connecting the armatures and providing the magnetic flux in the direction of the axis of rotation, an annular induction coil being supplied with alternating current and housed between the air gap and the wedge, and one or two armature coils being received by one or both of the armatures generating an alternating magnetic flux.

9 Claims, 2 Drawing Sheets

HOMOPOLAR COMPOUND-TYPE ASYNCHRONOUS MOTOR

CROSS-REFERENCES TO RELATED APPLICATIONS

This application is a continuation of International Application No. PCT/FR2016/051292, filed May 30, 2016, which claims the benefit of French Application No. 1501109, filed May 29, 2015, the disclosures of which are expressly incorporated herein by reference in their entirety.

BACKGROUND

As is known, an asynchronous induction motor includes a polyphase stator and a rotating squirrel cage rotor. In some cases the rotor is produced with a polyphase winding. The torque supplied by the machine is directly proportional to the armature current, which causes intense heating of the rotor, which is not cooled.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The invention concerns a squirrel cage asynchronous rotating electrical machine in which none of the electrical coils rotates and the structure of which is of homopolar compound type.

The invention proposes a solution to this heating of the rotor by attaching the various coils of the motor, including the rotor cage, to the stator, which is easy to cool by conduction because it does not move.

DESCRIPTION OF THE DRAWINGS

The invention will now be described in more detail with reference to the following figures, in which.

DETAILED DESCRIPTION

Figure 1A:
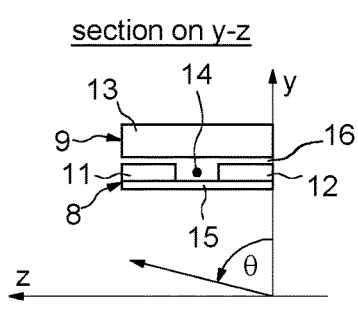
FIGS. 1a to 1c show a homopolar compound machine.

In the description of the invention the term "electromagnetic armature" designates the stator generating a magnetic flux consisting of a continuous component and/or an alternating component. The generated magnetic flux exits the electromagnetic armature at the level of a substantially annular surface termed the air gap surface about the direction axis z and in a substantially radial direction in a plane x-y perpendicular to the axis z.

Said electromagnetic armature is fed with alternating current, optionally with a direct current component. It can be a single armature or comprise a plurality of electromagnetic armatures associated in a parallel manner with respect to the rotation axis to form a polyphase machine. Said electromagnetic armature forms the stator of the rotating electrical machine. It is annular, hollow or solid at its center, can receive an electrical winding and includes a number Npp of magnetic pole pairs. This number corresponds to the number of pairs of alternations of the entry magnetic flux (South pole) and exit magnetic flux (North pole) in the radial axial direction z through its air gap surface.

In the description of the invention the term "air gap surface" designates a cylinder with axis z that corresponds to the mean surface of magnetic interaction between the rotor and the stator.

In the description of the invention the axis denoted z corresponds to the rotation axis of the electrical machine, the axis denoted x corresponds to the direction tangential to a cylinder centered on the axis z and the axis y corresponds to the direction of a radius of a disk centered on the axis z. The term "polar plane" designates a plane orthogonal to the axis z.

In the description of the invention the term "magnetic pole" corresponds to areas of the periphery of electromagnetic armatures 11 and 12 (see FIGS. 1a to 1c) where the magnetic flux exits in a direction that is substantially radial relative to the electromagnetic armature 11, 12 at North magnetic poles N and re-enters electromagnetic armature 11, 12 at South magnetic poles S. The magnetic flux crosses the air gap surface at least partially.

In the description of the invention the term "SMC powder" refers to an iron powder characterized by the partial electrical insulation of the individual particles that form it, such as for example the SMC powder marketed by the company Hoganas. This powder is compressed using one of the methods from the following non-exhaustive list: cold or hot pressed iron powder, hot cured cold or hot pressed iron powder, ferrite, sintered iron powder. The process applied to the SMC powder enables a magnetic circuit to be obtained in which the Eddy current losses are reduced and with an isotropic magnetic characteristic.

The invention describes a single-phase or two-phase machine. Obviously, a polyphase machine including at least two phases is produced by stacking axially along the same rotation axis a plurality of single-phase machines conforming to the invention and where applicable connecting them via magnetic parts and coils in order to form a compound machine.

According to the invention the rotating electrical machine includes at least one stator and at least one rotor having magnetic flux return parts arranged in an air gap between the rotor and the stator and is characterized in that the magnetic flux return parts are held together by a support conducting neither magnetic flux nor electricity, the stator being formed of the following elements:

at least one pair of fixed electromagnetic armatures arranged axially in an axial direction z and substantially centered on the axis z, one or the other of said electromagnetic armatures receiving at least one armature coil generating a substantially alternating magnetic flux in the air gap;

a magnetic shim that connects the armatures and in which the magnetic flux circulates in the axial direction z between said armatures substantially between all the facing magnetic poles of each of the armatures in the axial direction z, said shim being placed in contact with the armatures on their annular face opposite the air gap; and a straight or twisted annular induction coil disposed between the air gap and the magnetic shim.

According to one possible configuration at least one of the armatures can comprise a field yoke on which are arranged protrusions the free end of which flanks the air gap and on which an armature coil is wound.

This coil can for example pass alternately from one protrusion to another, changing side, or be wound around each of the protrusions and then connected to the following protrusion.

According to one possibility, at least one of the armatures can include a magnetic field yoke formed of laminations arranged in a polar plane x-y and stacked in a substantially parallel manner in the direction z.

The protrusions can be configured as mushrooms placed substantially regularly on the cylindrical surface with axis z of said field yoke nearest the air gap, said mushrooms being formed of laminations arranged in a plane y-z and stacked substantially parallel to one another in a rotation polar direction θ or in a tangential direction x or in a variable direction which is substantially perpendicular to the rotation axis z, said mushrooms being disposed between the field yoke and the air gap and placed on the field yoke on a substantially annular mechanical interaction surface with axis z, said mushrooms including a recess that receives the armature coil.

According to one possible configuration, the annular induction coils are fed with direct current.

According to one possibility, the magnetic shim can moreover be made from a magnetic material that accepts alternating fluxes such as an SMC powder or laminations arranged in a substantially polar plane and stacked along a polar direction θ in order to form a ring capable of conducting the alternating magnetic flux of axial direction z, with the armature coils of the armatures independently connected in short-circuit or connected in series and in short-circuit, the annular induction coil then being fed with alternating current.

Alternatively, said armature coil is replaced by a short-circuited cage.

Finally, the invention also concerns a rotating electrical machine comprising an assembly in the axial direction z of a plurality of rotating electrical machines as defined above.

Figure 1B:
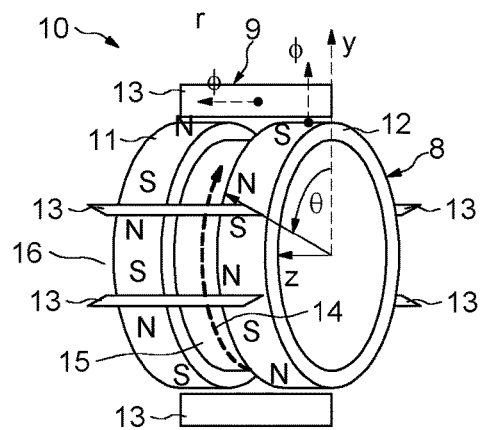
Figure 1C:
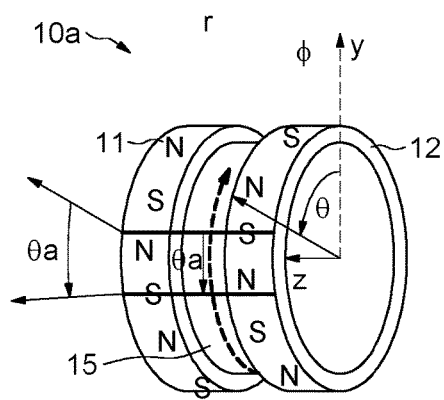

The homopolar compound motor 10, as shown in FIGS. 1a to 1c, which constitutes a nonlimiting example presented in a so-called inverted version, i.e. with external rotor, includes at least one stator 8 and at least one rotor 9. The rotor 9 includes magnetic flux return parts 13 arranged in the air gap 16 between the rotor 9 and the stator 8. According to the invention, these parts are held together by a support that does not conduct either magnetic flux or electricity.

The stator 8 is formed of the following elements, which can be seen in FIGS. 1a to 1c:
- at least one pair of fixed electromagnetic armatures 11 and 12 arranged axially in the axial direction z and substantially centered on the axis z, one or the other of which electromagnetic armatures receive at least one armature coil (see subsequent figures) generating a substantially alternating magnetic flux in the air gap 16,
- a magnetic shim 15 that connects the armatures 11 and 12 and in which the magnetic flux circulates in the axial direction z between the armatures 11 and 12 substantially between all the facing magnetic poles of each of the armatures 11 and 12 in the axial direction z, the magnetic shim 15 preferably being placed in contact with the armatures 11 and 12 on their annular face opposite the air gap surface,
- a straight or twisted annular induction coil 14 disposed between the air gap 16 and the magnetic shim 15.

In a particularly economical embodiment the magnetic shim 15 is made from either solid mild steel or some other solid ferromagnetic material.

According to one particular embodiment the support for the magnetic flux return parts 13 is made from a magnetic or magnetic stainless steel.

Said magnetic flux return parts 13 conduct a magnetic flux consisting of an alternating component and/or a continuous component, which imposes a particular implementation. For example, in a first embodiment with laminations said magnetic flux return parts 13 are disposed in a polar plane x-y and stacked annularly by movement substantially in the rotation direction θ. According to a second embodiment said return parts 13 are manufactured using SMC powder. They are characterized by a section in the polar plane adapted to conduct the flux emitted by the electromagnetic armatures 11 and 12, preferably without causing excessive magnetic saturation therein. The number of said magnetic flux return parts 13 is equal to half the number of magnetic poles of the electromagnetic armatures 11 and 12 and they are offset angularly to one another in a substantially constant manner.

The electromagnetic armatures 11 and 12 are preferably identical and include the same number of magnetic poles. The generation of the alternation of North and South poles in the electromagnetic armatures is produced by a coil and a particular geometry of the electromagnetic armatures, not shown in FIG. 1. This geometry is characterized in a first embodiment by salient poles (armature generating a single-phase magnetic flux) and in a second embodiment by smooth poles (armature generating a three-phase magnetic flux, corresponding to an equivalent rotating electromagnetic field).

The electromagnetic armatures 11 and 12 are offset angularly relative to each other by an angle θa (in a polar plane), as shown at 10a in FIG. 1c. This angle θa is defined by the angular offset between a marker in the plane x-y locked onto a South magnetic pole S of the electromagnetic armature 11 and a marker in the plane x-y locked onto the nearest South magnetic pole S of the armature 12.

According to a first embodiment the armatures 11 and 12 are in opposition, which corresponds to an angle θa=180°. In a second embodiment the armatures 11 and 12 are no longer in opposition but are offset by an angle other than 180°. The case θa=180° corresponds for example to a single-phase synchronous electric motor if the armatures 11 and 12 are of the salient pole type. The case θa=90° or θa=270° corresponds for example to a two-phase synchronous electric motor if the armatures 11 and 12 are of the salient pole type.

The excitation coils (not shown in FIG. 1c) of the electromagnetic armatures 11 and 12 are fed with a substantially alternating current the frequency of which is substantially equal to the rotation frequency of the rotor 9 multiplied by the number Npp of identical pole pairs and the temporal phase of which relative to the mechanical position of the rotor 9 is calculated so as to optimize the rotor torque generated.

The homopolar compound motor is notably of interest because it includes no rotating coils and no magnets. It allows operation in BLDC synchronous mode with a high overspeed capacity thanks to defluxing by the induction coil reducing the excitation current of the induction coil 14.

In one particular embodiment the magnetic shim 15 is replaced or supplemented by an annular magnet that generates a magnetic flux in axial direction z. It is then optionally possible to eliminate the excitation coil 14.

All the magnetic parts forming the homopolar machine 10 can be produced from either cut and stacked ferromagnetic laminations or SMC powder. In one economical embodiment the magnetic shim 15 can instead be made of a solid magnetic material such as steel or soft iron.

Figure 2:
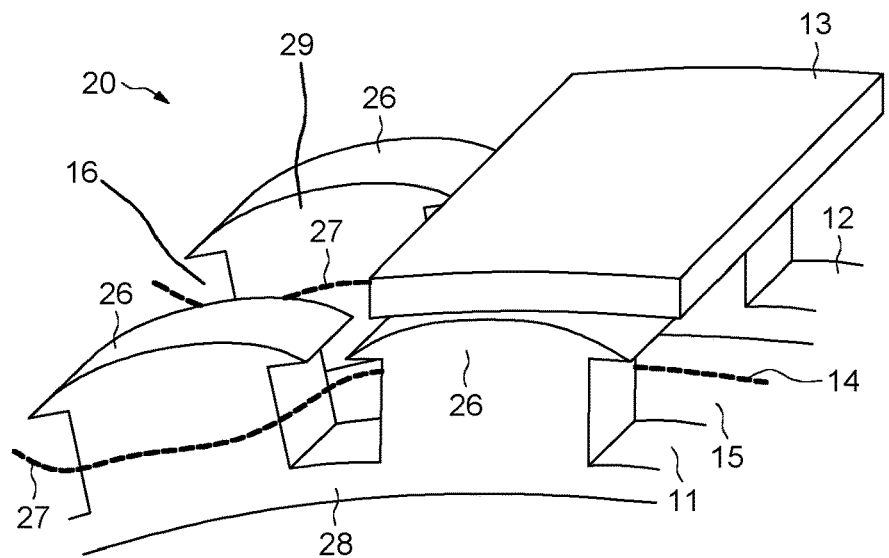
FIG. 2 shows one particular embodiment of the homopolar compound machine utilizing mushroom teeth.

In one particular embodiment 20 of the armatures 11 and/or 12, as shown in FIG. 2, one and/or the other of the electromagnetic armatures 11 or 12 consist(s) of a field yoke 28 on which are arranged protrusions 26 the free ends 29 of which flank the air gap 16 and around which is wound an armature coil 27. The latter either passes alternately from one protrusion 26 to another, changing side, or is wound around each of the protrusions 26 and then connected to the next protrusion 26.

In this embodiment 20 from FIG. 2 the magnetic flux return parts 13 preferably have a pole length in the polar angular direction θ substantially equal to the angular length—in line with the air gap 16—of the polar protrusions 26. In said particular embodiment 20 the magnetic flux return parts 13 preferably have a section in the polar section plane substantially equal to the section of the polar protrusions 26 in a cylindrical plane in line with the air gap 16.

In the particular embodiment 20 the armatures 11 and 12 can also be produced with sheet metal or SMC powder claws.

Figure 3:
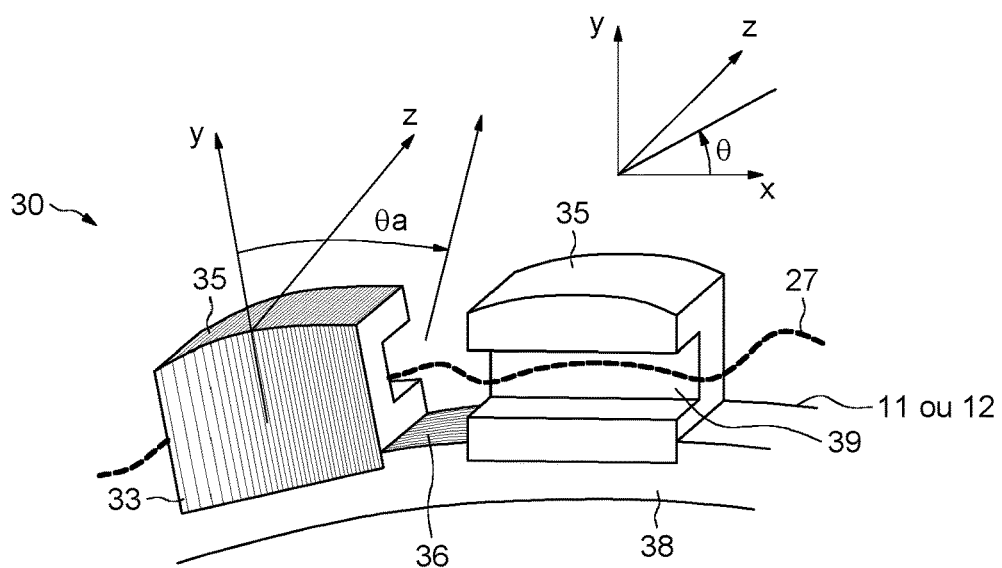
FIG. 3 shows one particular embodiment of the homopolar compound machine utilizing claw teeth.

In another embodiment 30 of the armatures 11 and/or 12, as shown in FIG. 3, one and/or the other of electromagnetic armatures 11 or 12 consist(s) of:
- an electromagnetic field yoke 38 formed of laminations 36 which are arranged in a polar plane x-y and stacked in a substantially parallel manner in the direction z,
- mushrooms 35 placed in a substantially regular manner on the cylindrical surface with axis z of said field yoke 38 nearest the air gap 16. The mushrooms 35 are formed of laminations 33 arranged in a plane y-z and stacked in a substantially parallel manner in the rotation polar direction θ or in the tangential direction x or in a variable direction which is substantially perpendicular to the rotation axis z. Said mushrooms 35 are disposed between the field yoke 38 and the air gap 16 and are placed on the field yoke 38 on a substantially annular mechanical interaction surface with axis z. They preferably include a recess 39 receiving the armature coil 27.

In this particular embodiment 30, in order to simplify the description of the invention and for consistency with the description of the other embodiments, the angle θa is measured from the center of radial symmetry of a mushroom 35 the plane face of which in the polar plane is oriented in the direction of decreasing ordinates z. Any other definition of θa consistent with the latter definition remains valid.

It is apparent that in this particular embodiment 30 the fluxes in the rotating electrical machine are of the type simultaneously transverse to the rotor 9 and to the stator 8.

In the particular embodiments 20 and 30 the field yokes 28 and/or 38 are in a first case annular and in a second case disc-shaped.

The invention in fact proposes to transform the homopolar compound motor 10 or 20 or 30 which operates in BLDC synchronous mode and the induction coil 14 of which is fed with direct current into a homopolar asynchronous machine. The invention utilizes the same structure as the machine 10 in its particular embodiments 20 or 30. The invention is characterized by the following apparent differences in the particular embodiments 10, 20 and 30:
- the magnetic shim 15 is made from a magnetic material that accepts alternating fluxes such as an SMC powder or laminations arranged in a substantially polar plane and stacked along an angular direction θ in order to form a ring capable of conducting the alternating magnetic flux in axial direction z,
- the armature coils of the armatures 11 and 12 in the embodiment 10 or the armature coils 27 in the embodiment 20 or 30 are independently connected in short-circuit; in another embodiment they are connected in series and connected in short-circuit; in a further embodiment each armature coil 27 is replaced by a short-circuit cage similar to that of a prior art induction machine,
- to feed the motor with electrical energy the excitation or induction coil 14 is fed with an alternating current.

The machine obtained is an asynchronous induction machine which operates in exactly the same manner as a prior art induction machine. As already mentioned, a polyphase machine is constructed by axially combining a plurality of machines according to the invention. The operating mode of the dual power supply asynchronous machine is obtained by feeding the armature and the field coil simultaneously with alternating current.

The description of the invention has referred throughout to a rotating electrical machine in which the air gap surface is a cylinder centered on its rotation axis z. The transposition of the invention to a disc-type machine in which the air gap surface is an annular or solid disk centered on the rotation axis is effected in a manner obvious for a person skilled in the art using the appropriate design symmetries, which for example transpose radial fluxes into tangential fluxes and vice versa.

The above description of the invention moreover extends to all operating modes of the rotating electrical machine described in the four operating quadrants of the shaft torque-speed curve and consequently in motor, generator and brake modes and in positive and negative rotation directions.

The invention covers not only external rotor configurations, as shown, but also structures with an internal rotor. The passage from one to the other is effected by mirror effect relative to the air gap surface, as described in the prior art, utilizing radial symmetry centered around the air gap surface.

It should be noted that the description of the rotating electrical machine according to the invention can be extended to a linear electrical machine by effecting a suitable transformation which unrolls the dimensions along the polar axis x into linear dimensions.

Some or all of the ferromagnetic parts constituting the invention can in any event be made from SMC powder.

The electrical machine of the invention can include sheet metal claw or removable teeth armatures. The electrical machine of the invention can be controlled by an open-loop voltage control algorithm and can optionally integrate a method of reducing the noise of its coder. The electrical machine of the invention can be insulated using a high-temperature insulation process based on silicone.

All the elements that have been described for this invention can be extended to other rotating or static electrical machines including any number of electrical phases and electromagnetic magnetic poles. The present invention is not limited to the embodiments described but extends to any modification and variant obvious to a person skilled in the art whilst remaining within the scope of the protection defined by the appended claims.

While illustrative embodiments have been illustrated and described, it will be appreciated that various changes can be made therein without departing from the spirit and scope of the invention.

We claim:

1. A rotating electrical machine including at least one stator and at least one rotor having magnetic flux return parts arranged in an air gap between the rotor and the stator, the stator being formed of the following elements:
- at least one pair of fixed electromagnetic armatures arranged axially in an axial direction z and substantially centered on a z axis, one or the other of said fixed electromagnetic armatures receiving at least one armature coil generating a substantially alternating magnetic flux in an air gap;
- a magnetic shim that connects the armatures and in which the magnetic flux circulates in the axial direction z between the armatures substantially between all the facing magnetic poles of each of the armatures in the axial direction z, the magnetic shim being placed in contact with the armatures on their annular face opposite the air gap; and
- a straight or twisted annular induction coil disposed between the air gap and the magnetic shim.

2. The rotating electrical machine of claim 1, characterized in that at least one of the armatures comprises a field yoke on which are arranged protrusions, a free end of which flanks the air gap and on which a coil is wound.

3. The rotating electrical machine of claim 2, characterized in that the armature coil passes alternately from one protrusion to another, changing side, or is wound around each of the protrusions, and then connected to the following protrusion.

4. The rotating electrical machine of claim 2, characterized in that the protrusions are configured as mushrooms placed substantially regularly on a cylindrical surface with axis z of said field yoke nearest the air gap, said mushrooms being formed of laminations arranged in a plane y-z and stacked substantially parallel to one another in a rotation polar direction θ or in a tangential direction x or in a variable direction which is substantially perpendicular to the axis z, said mushrooms being disposed between the field yoke and the air gap and placed on the field yoke on a substantially annular mechanical interaction surface with axis z, said mushrooms including a recess that receives the coil.

5. The rotating electrical machine of claim 2, characterized in that at least one of the armatures includes a magnetic field yoke formed of laminations arranged in an x-y plane and stacked in a substantially parallel manner in the direction z.

6. The rotating electrical machine of claim 1, characterized in that the annular induction coils are fed with direct current.

7. The rotating electrical machine of claim 1, characterized in that the magnetic shim is made from a magnetic material that accepts alternating fluxes such as an SMC powder or laminations arranged in a substantially polar plane and stacked along a polar direction θ in order to form a ring capable of conducting the alternating magnetic flux of axial direction inside it,
- the armature coils of the armatures are independently connected in short-circuit or connected in series and in short-circuit, or
- the annular induction coil is fed with alternating current.

8. The rotating electrical machine of claim 7, characterized in that each armature coil is replaced by a short-circuited cage.

9. A rotating electrical machine comprising an assembly in the axial direction z of a plurality of rotating electrical machines according to claim 1.

* * * * *